United States Patent
Smith et al.

(10) Patent No.: US 10,875,633 B2
(45) Date of Patent: Dec. 29, 2020

(54) SKID LANDING GEAR ASSEMBLY

(71) Applicant: Bell Helicopter Textron Inc., Fort Worth, TX (US)

(72) Inventors: Michael R. Smith, Colleyville, TX (US); John C. Larkin, III, Bristol, TN (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 455 days.

(21) Appl. No.: 15/894,888

(22) Filed: Feb. 12, 2018

(65) Prior Publication Data
US 2019/0248479 A1    Aug. 15, 2019

(51) Int. Cl.
*B64C 25/52* (2006.01)
*B64F 5/00* (2017.01)
*B64C 25/32* (2006.01)

(52) U.S. Cl.
CPC ............ *B64C 25/52* (2013.01); *B64F 5/00* (2013.01); *B64C 2025/325* (2013.01)

(58) Field of Classification Search
CPC ....... B64C 2025/325; B64C 25/52; F16F 7/14
See application file for complete search history.

(56) References Cited

U.S. PATENT DOCUMENTS

| | | | |
|---|---|---|---|
| 2,479,976 A * | 8/1949 | Shultz ..................... | B64C 25/06 244/104 LS |
| 3,507,466 A * | 4/1970 | La Fleur ................. | B64C 25/56 244/105 |
| 4,270,711 A | 6/1981 | Cresap et al. | |
| 4,645,143 A * | 2/1987 | Coffy ....................... | B64C 25/52 244/100 R |
| 4,659,069 A * | 4/1987 | Odobasic ................ | B64C 25/64 244/104 R |
| 5,224,669 A * | 7/1993 | Guimbal .................. | B64C 25/52 244/100 R |
| 6,244,538 B1 * | 6/2001 | Howard ................... | B64C 25/52 244/104 R |
| 6,427,942 B2 | 8/2002 | Howard et al. | |
| 8,919,694 B2 * | 12/2014 | Amante ................... | B64C 25/52 244/108 |
| 8,998,134 B2 * | 4/2015 | Fews ....................... | B64C 25/52 244/108 |
| 9,085,361 B2 * | 7/2015 | Prud'Homme-Lacroix ............... | B64C 25/58 |
| 9,315,262 B2 * | 4/2016 | Prud'Homme-Lacroix ............... | B64C 25/52 |
| 9,994,308 B2 * | 6/2018 | Bernier ................... | B21D 53/92 |
| 2013/0164129 A1 | 6/2013 | Rauber et al. | |

(Continued)

*Primary Examiner* — Philip J Bonzell
*Assistant Examiner* — Michael B. Kreiner
(74) *Attorney, Agent, or Firm* — Timmer Law Group, PLLC (57) ABSTRACT

An aspect provides a skid landing gear assembly including a cross member disposed between a first skid tube and a second skid tube, and a tension cable member configured to be disposed in the cross member; wherein the tension cable member resists outward deflection of at least a portion of the skid landing gear assembly when a downward load is applied to the skid landing gear assembly. In other aspects, there are methods of avoiding ground resonance in a skid landing gear assembly, methods of assembling a skid landing gear assembly, methods of operating a helicopter with a skid landing gear assembly, and methods of improving the service life of a skid landing gear assembly.

10 Claims, 9 Drawing Sheets

(56) References Cited

U.S. PATENT DOCUMENTS

2014/0224928 A1    8/2014  Bernier et al.
2016/0280362 A1*   9/2016  Prud'Homme-Lacroix ................
                                                    B64C 25/52
2017/0271756 A1*   9/2017  Liang .................... B64C 39/024

* cited by examiner

SKID LANDING GEAR ASSEMBLY

BACKGROUND

Technical Field

The present disclosure relates to aircrafts, and more particularly to skid landing gear for rotorcraft.

Description of Related Art

Helicopters, and particularly small and medium helicopters, may be equipped with a skid type landing gear. Conventional skid landing gear systems generally include two longitudinal skid tubes for contacting the ground and two cross tubes, fore and aft, connecting the skid tubes to the body of the helicopter, although alternate designs are also possible.

Skid landing gear systems are generally designed with consideration of energy absorption during hard landings, stress levels in normal landings which should be low enough to ensure a satisfactory fatigue life, and an appropriate stiffness to avoid critical ground resonance modes. Moreover, skid landing gear systems are designed to maximize fatigue life during normal rotorcraft operations.

Conventional cross tubes typically have a generally circular or rectangular constant cross-section to facilitate bending to a desired shape. A conventional cross tube has a circular cross section extruded with uniform wall thickness, which defines a circular channel therein. Conventional cross tubes are subjected to significant vertical loads and outward deflection during landing of the helicopter. The outward deflection exerts significant tensile stress on the lower wall of the rear cross tube as the upper wall of the cross tube is deflected. Conventional cross tubes, particularly the rear cross tubes, can suffer fatigue failure and cracking of the lower wall region as result of excessive tensile stresses experienced during numerous repeated landings of the helicopter.

There is a need for a skid landing gear assembly for a rotorcraft configured to reduce tensile stress experienced by the cross tube, especially the rear cross tube, during landings of the rotorcraft.

SUMMARY

In a first aspect, there is provided a skid landing gear assembly, including a cross member disposed between a first skid tube and a second skid tube, and a tension cable member configured to be disposed in the cross member; wherein the tension cable member resists outward deflection of at least a portion of the skid landing gear assembly when a downward load is applied to the skid landing gear assembly.

In an embodiment, the cross member comprises a cross tube.

In another embodiment, the tension cable member includes a first end and a second end connected to the respective first and second skid tubes.

In one embodiment, the tension cable member includes a first end fitting and a second end fitting connecting the tension cable member to the respective first and second skid tubes wherein at least one of the first and second end fittings includes a tension adjustment member to adjust the tension in the tension cable member.

In yet another embodiment, the tension adjustment member includes a threaded shaft connected to at least one of the first end of the tension cable member and the second end of the tension cable member; and an adjustment nut threaded on the shaft.

In still another embodiment, the tension cable member is a single or multi-strand cable comprised of at least one of the following: a metallic material, a non-metallic material, and combinations thereof.

In an embodiment, the tension cable member comprises a composite cable.

In another embodiment, the composite cable comprises fibers disposed in a matrix.

In still another embodiment, the cross member includes at least one of the following: a front cross member and a rear cross member.

In yet another embodiment, the respective first and second ends of the tension cable member are connected to an intermediate portion of the respective first and second skid tubes.

In an embodiment, the tension cable member is received in the cross member and also in at least a portion of the respective first and second skid tubes.

In an embodiment, the respective first and second ends of the tension cable member are connected to a closed end of the respective first and second skid tubes.

In a second aspect, there is provided a method of assembling a skid landing gear having a cross member connected between a first skid tube and a second skid tube, including positioning a tension cable member in the cross member, the tension cable member having a first end and a second end opposite from the first end; and tensioning the tension cable member.

In an embodiment, the tensioning step inwardly deflects at least a portion of the skid landing gear.

In another embodiment, at least a portion of the cross member is deflected inward.

In still another embodiment, the method further includes connecting the respective first and second ends of the tension cable member to an intermediate portion of the respective first and second skid tubes.

In one embodiment, the tension cable member is received in the cross member and also in at least a portion of the respective first and second skid tubes.

In an embodiment, the respective first and second ends of the tension cable member are connected to a closed end of the respective first and second skid tubes.

In a third aspect, there is provided a method of operating a helicopter with skid landing gear assembly connected to a fuselage, including landing the helicopter on the skid landing gear assembly comprising a front cross member and a rear cross member connected between skid tubes in a manner that applies a downward load to the skid landing gear assembly, and resisting outward deflection of a least a portion of the skid landing gear assembly by a tension cable member residing in at least one of the front cross member and the rear cross member.

In an embodiment, the method provides that tensile stress in the tension cable member increases as outward deflection of at least a portion of the skid landing gear assembly increases.

In a fourth aspect, there is provided a method of designing a skid landing gear assembly having a cross member connected between a first skid tube and a second skid tube, the method comprising the step of determining an amount of tension for a tension cable member disposed in the cross member to achieve a selected stiffness therefor, wherein the selected stiffness of the cross member retains ground resonance avoidance.

In an embodiment, the method further includes tensioning the tension cable member the determined amount of tension to deflect at least a portion of the skid landing gear assembly.

In a fifth aspect, there is provided a method of improving the service life of a skid landing gear assembly, the method comprising the steps of: providing a helicopter having a fuselage and a skid landing gear assembly coupled to the fuselage, the skid landing gear assembly including a cross member connected between a first skid tube and a second skid tube; and applying tension to at least a portion of the skid landing gear assembly, such that outward deflection of at least a portion of the skid landing gear assembly is resisted when a downward load is applied.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the skid landing gear assembly and methods related thereto are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," "outward", "inward", or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The skid landing gear assembly, components and features thereof, and methods relating thereto provide significant advantages over conventional skid landing gear assemblies. In particular, the skid landing gear assembly utilizes a tension cable member that carries a portion of the tensile stress exerted on the skid landing gear assembly when a downward load is applied thereto (e.g., during landing). The tension cable member can resist outward deflection of the skid landing gear assembly when a downward load is applied thereto. The skid landing gear assembly, components and features thereof, and methods relating thereto can advantageously avoid ground resonance during landing and/or improve the service life of the skid landing gear assembly. Further discussion and illustration of these features are provided below.

This disclosure depicts and describes a skid landing gear assembly, components and features thereof, and methods relating thereto. Any skid landing gear assembly, component and feature thereof, or method relating thereto depicted in FIGS. 1-13 and/or described herein can be used with the helicopter depicted in FIG. 1. Additionally, the skid landing gear assembly, components and features thereof, and methods relating thereto depicted and/or described herein can be used with any aircraft having a skid landing gear assembly, including, but not limited to, tiltrotor aircrafts, helicopters, tilt wing aircrafts, unmanned aerial vehicles (UAVs), drones, hovercrafts, and other vertical lift or VTOL aircrafts. Several embodiments of the skid landing gear assembly, components and features thereof, and methods relating thereto are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 1:
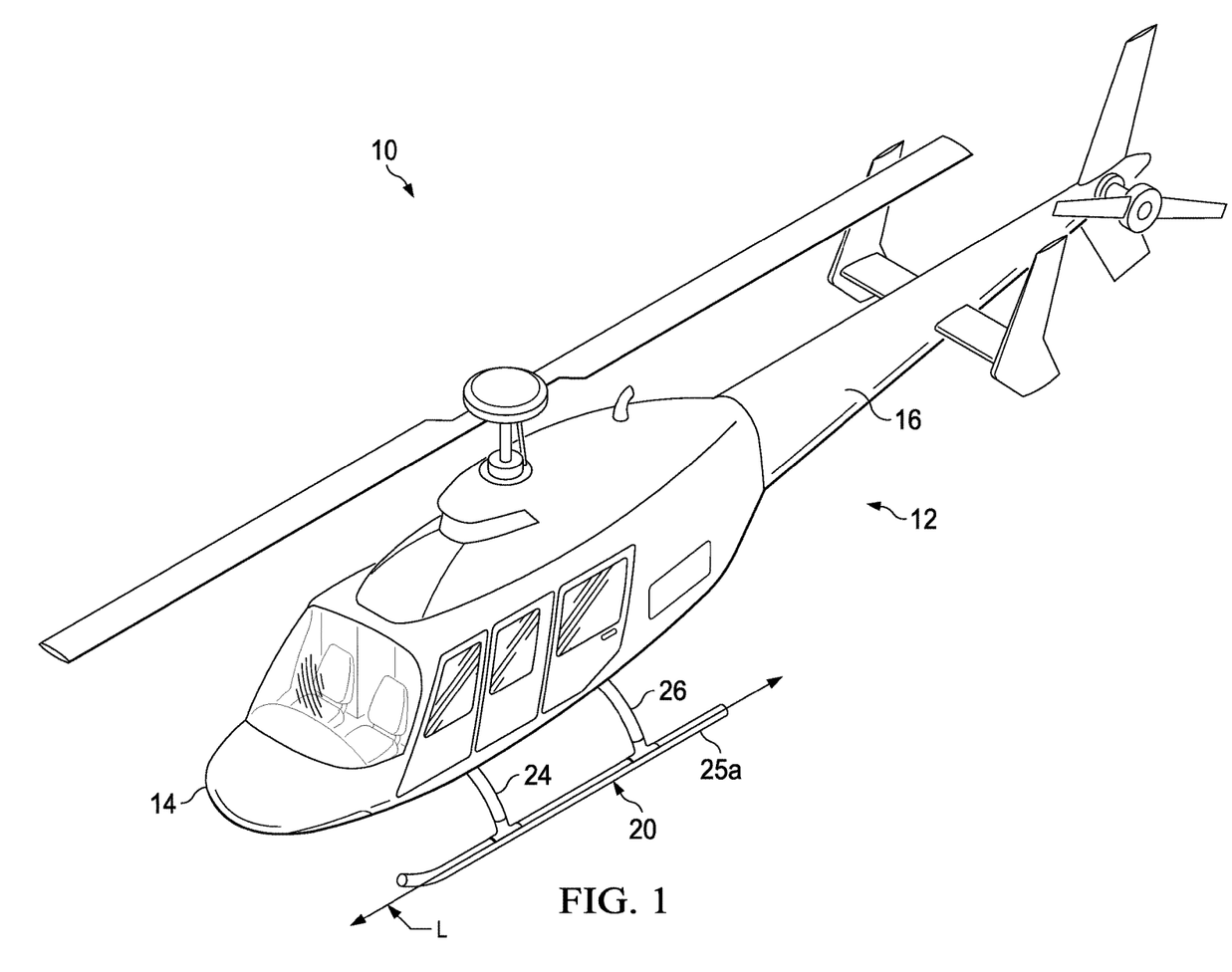
FIG. 1 is a schematic orthographic view of a helicopter.

Referring now to FIG. 1, a helicopter 10 is generally shown. The helicopter 10 includes a fuselage 12 having a cabin portion 14 and a tail boom 16. The helicopter 10 is powered by one or more engines, a propulsion system such as a rotor system, and a flight control system. A skid landing gear assembly 20 is attached to a bottom portion of the fuselage 12.

Figure 2:
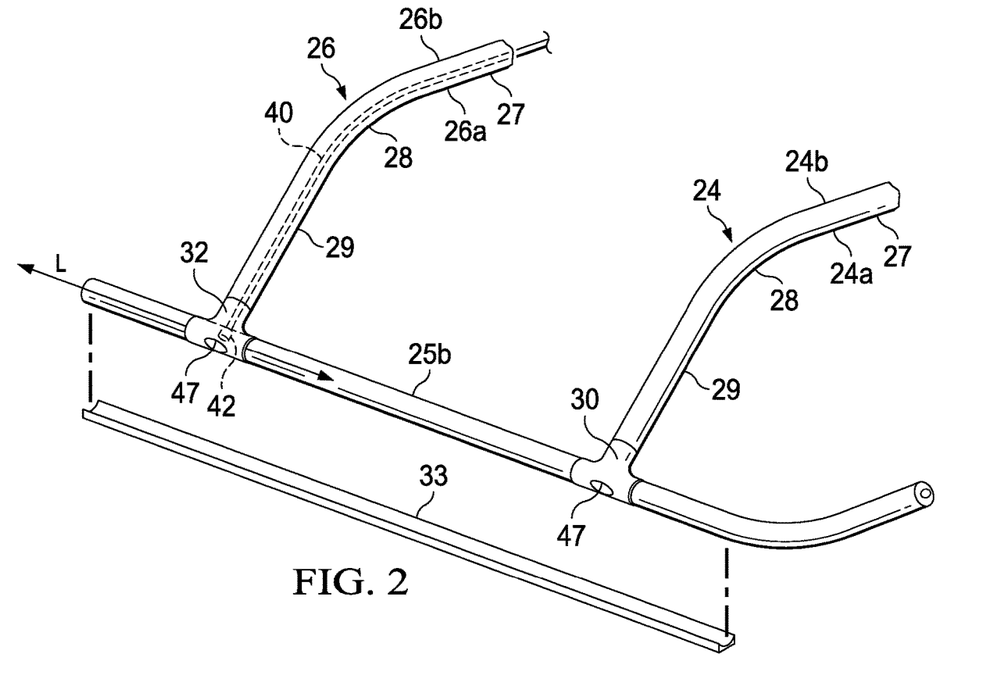
FIG. 2 is a schematic orthographic view of part of a skid landing gear assembly of a helicopter.
Figure 3A:
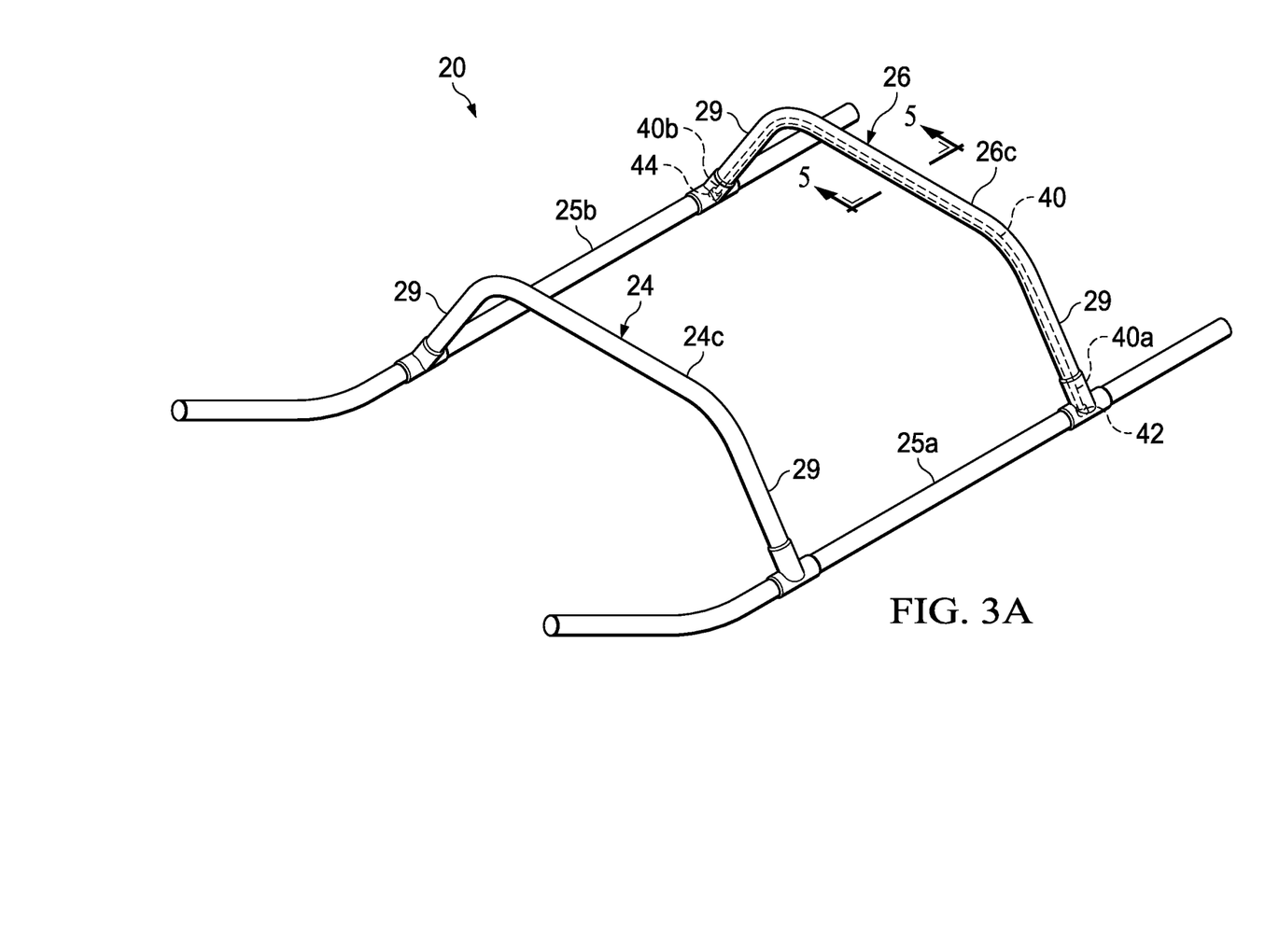
FIG. 3A is a schematic orthographic view of a complete skid landing gear showing the tension cable member (in dashed lines) received in the rear cross member, according to an exemplary embodiment.

Referring to FIGS. 2 and 3A, in a particular embodiment, the skid landing gear assembly 20 is formed of structural tubes including a first and second longitudinal skid tubes 25a, 25b (only second skid tube 25b is shown) for contact with the ground, and front and rear cross members 24, 26 configured to interconnect the first and second skid tubes 25a, 25b. A longitudinal direction can be defined along the ground contact portion of one of the first or second skid tubes 25a, 25b; when the helicopter 10 rests on a horizontal ground surface, the longitudinal axis L is thus horizontal. The front and rear cross members 24, 26 are attached to the fuselage by fittings (not shown), which are external or internal to the fuselage. The front and rear cross members 24, 26 can be connected directly to first and second skid tubes 25a, 25b or, alternately, by optional connecting boots 30, 32 fastened to the cross members 24, 26 and to the first and second skid tubes 25a, 25b, FIGS. 1-2 and 3A. A protective cover strip 33 can be attached to the bottom of each skid tube 25a, 25b, as shown in FIG. 2.

Each of the front and rear cross members 24, 26 includes a central portion 27 and a side portion 29. The central portion 27 is generally straight or substantially straight with slight arching and is connected with the side portion 29 at bend 28. The side portion 29 is also generally straight or substantially straight. Front and rear cross members 24, 26 each includes a respective concave lower wall 24a, 26a and a respective convex upper wall 24b, 26b. It should be appreciated that the front and rear cross members 24, 26 are merely examples and that other configurations and geometries exist therefor. For example, referring now to FIGS. 3B-3C, a skid landing gear assembly 120 employs curved front and rear cross members 124, 126 that each includes a respective concave lower wall 124a, 126a and a respective convex upper wall 124b, 126b.

Referring to FIG. 3A front and rear cross members 24, 26 may be made of a metal, such as aluminum or steel, although composite materials may be employed as well. In a preferred embodiment, front and rear cross members 24, 26 can be cross tubes having a hollow channel 24c, 26c, respectively. The cross-sectional shape of the front and/or rear cross members 24, 26 is substantially round or circular, or oval, although other shapes can be used in practice of the embodiments of the invention. For example, the front and/or rear cross members 24, 26 can comprise I-beam configurations or other shapes that can be solid or partially solid and include a hollow channel. In an embodiment, the front and/or rear cross members 24, 26 are monolithic, i.e. made from a single continuous tube formed to obtain the desired profile and having a hollow channel therein.

Figure 4:
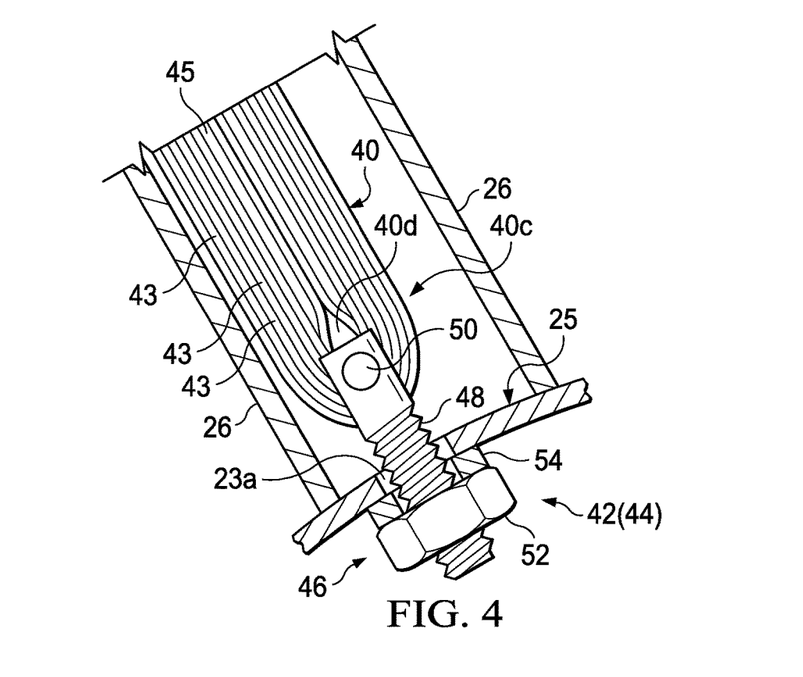
FIG. 4 is a partial cross-sectional view of an illustrative tension cable member showing a cable end fitting for connection to a skid tube of the skid landing gear assembly, according to an illustrative embodiment.

An embodiment of the invention provides a skid landing gear assembly 20 that includes a tension cable member 40 that is received in at least one of the hollow channel 24c, 26c of the front and rear cross members 24, 26, respectively, as shown in FIGS. 2, 3A, and 4. In the embodiment shown, the front and rear cross members 24, 26 are substantially symmetric, therefore, for the sake of efficiency the front and rear cross member 24, 26 will be disclosed only with regard to rear cross member 26. However, one of ordinary skill in the art would fully appreciate an understanding of the front cross member 24 based upon the disclosure herein of rear cross member 26.

Figure 5:
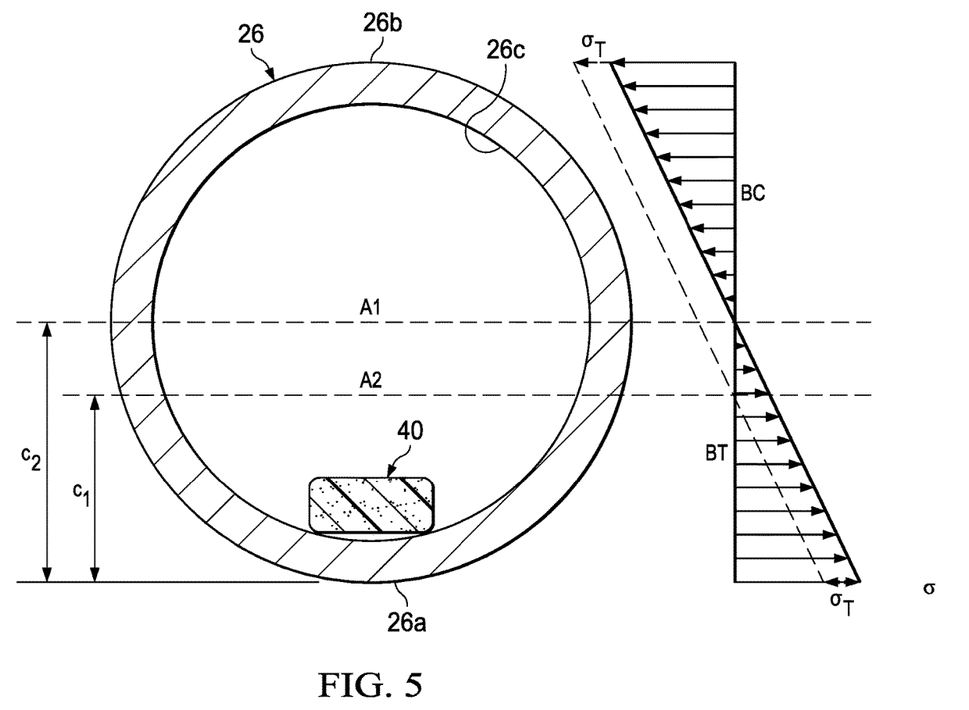
FIG. 5 is a cross-sectional view (taken along lines 5-5 of FIG. 3A) of the rear cross member showing a position of the tension cable member therein, according to an illustrative embodiment.

The tension cable member 40 is adjusted to a tension amount that a stress exerted on the rear cross-tube 26, especially the lower wall 26a of the rear cross member 26, during landing of the helicopter is reduced when a downward load is applied to the rear cross member 26. That is, the tension cable member 40 carries at least a designed portion of the tensile load in response to downward load of the skid landing gear assembly 20 during helicopter 10 landing to thereby reduce the tension load exerted on the rear cross member 26. For example, the tension cable member 40 reduces the tensile loads experienced by lower and upper walls 26a, 26b of the rear cross member 26 and resists outward deflection thereof. Referring now to FIG. 5, the tension cable member 40 reduces the tensile load on the skid landing gear assembly 20 such that a neutral first axis of bending A1 (rear cross member 26 in a non-tensioned position) shifts towards a neutral second axis of bending A2 (cross member 26 in a tensioned position) thereby reducing the bending stress, $\sigma = Mc/I$, where M is the bending moment, I is the cross-sectional area moment of inertia, and c is the distance from the neutral first axis of bending A1 to the point of stress calculation. Bending compression BC generally begins at the neutral first axis of bending A1 and increases in amount until the topmost point on the upper wall 26b. Bending tension BT tends to arise at the neutral first axis of bending A1 and increases in amount until the lowermost point on the lower wall 26a. The shifting of the neutral first axis of bending A1 to the neutral second axis of bending A2 reduces the first distance $c_1$ to a second distance $c_2$, which reduces the bending stress σ. As shown by the dashed line in FIG. 5, the stress state is changed due to the introduction of the stress component $\sigma_T$ caused by the tension cable member 40, which causes the shift of the neutral first axis of bending A1 to the neutral second axis of bending A2, where the modified bending stress state now intersects. The use of the tension cable member 40 in the skid landing gear assembly 20 advantageously causes the neutral second axis of bending A2 to be disposed in the bending tension BT area, which reduces the maximum tensile loads experienced by the upper and lower walls 26a, 26b, respectively. Bending tension BT is more deleterious to bending fatigue than is bending compression BC.

In an exemplary embodiment, the tension cable member 40 can be disposed on an interior wall of the rear cross member 26, as shown in FIG. 5. The tension cable member 40 is tensioned to be located remotely from the neutral first axis A1 in the rear cross member 26.

In yet another embodiment, the tension cable member 40 can be configured to be disposed on an outward surface of the rear cross member 26. In an embodiment, the rear cross member 26 could be an I-beam with an outward surface that receives the tension cable member 40.

In an embodiment, the tension cable member 40 can alter the bend geometry of the rear cross member 26 and the rear cross member is in a tensioned position, while the geometry of the front cross member 24 remains in a non-tensioned position (e.g., lacking a tension cable member). The geometry of the front cross member 24 can be configured such that the first and second longitudinal skid tubes 25a, 25b remain parallel (e.g., the angle of bend 28 of the front cross member 24 can be adjusted).

Referring to FIG. 4, the tension cable member 40 can be any suitable elongated cable, strap, or the like, which can be pre-tensioned for use during operation of the helicopter 10. The tension cable member 40 can be round, strap-shaped with flattened sides, or any other suitable shape. The tension cable member 40 can comprise, but is not limited to, fibers 43 that can be composed of continuous filaments or fibers comprised of one or more materials including, but not limited to, metal (e.g., aluminum, steel, and other suitable metal materials), glass, carbon, graphite, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. However, fibers 43 described herein can include any suitable material or combination of materials. In an embodiment, fibers 43 can be disposed in a matrix 45. In a particular embodiment, the matrix 45 can be comprised of a polymeric matrix or any suitable resin system, such as a thermoplastic or thermosetting resin. Other exemplary resins can include epoxy, polyimide, polyamide, bismaleimide, polyester, vinyl ester, phenolic, polyetheretherketone (PEEK), polyetherketone (PEK), polyphenylene sulfide (PPS), and the like. In an embodiment, fibers 43 are woven fibers. In an embodiment, the tension cable member is comprised of fiberglass fibers composed of long filaments disposed in a polymeric matrix. In an embodiment, the rear cross member 26 could be a comprised of a composite material including fibers 43 disposed as a layer therein.

In an embodiment, the tension cable member 40 has a coefficient of expansion that is the same or similar to that of the material(s) from which the front and rear cross members 24, 26 are made.

In an embodiment, the tension cable member 40 includes a loop 40c, as shown in FIG. 4, at each of the first and second ends 40a, 40b for securing with a first and second end fittings 42, 44. The first and second end fittings 42, 44 can be connected to the respective first and second skid tubes 25a, 25b. In an embodiment, the first and second end fittings 42, 44 are disposed at intermediate portions of the first and second skid tubes 25a, 25b. In some embodiments, the tension cable member 40 resides in but is not connected to the rear cross member 26. The first and/or second end fittings 42, 44 can be configured to impart an initial tension amount on the tension cable member 40. In an embodiment, the first and/or second end fittings 42, 44 are adjustable.

In an exemplary embodiment, at least one of the first and second end fittings 42, 44 can include a tension adjustment member 46 that is/are torqued to adjust tension of the tension cable member 40 in the rear cross member 26, which can occur during assembly and/or during maintenance of the skid landing gear assembly 20. Referring now to FIG. 4, each tension adjustment member 46 comprises a threaded adjustment shaft 48 connected by a cross pin 50 disposed in an opening 40d in the loop 40c at each of the first and second ends 40a, 40b of the tension cable member 40 and a threaded adjustment nut 52 with adjacent lock washer 54 for securing thereon. In an exemplary embodiment, the threaded adjustment shaft 48 can be a threaded clevis. In some embodiments, the threaded adjustment shaft 48 can secure the tension cable member 40 using a standard washer with an additional lock nut on the opposite side of nut 52. The threaded adjustment shaft 48 extends through opening 23a in the wall of the first skid tube 25a and can be accessed through an access hole 47 in the skid tube 25. The cover strip 33 can cover access hole 47 during operation of helicopter 10 and/or, in some embodiments, a separate cover for the access hole may be provided. It should be appreciated that first and second end fittings 42, 44 may take on a wide variety of configurations suitable for connecting the tension cable member 40 to the front and rear cross members 24, 26 and/or the skid tubes 25; adjusting the amount of tension of the tension cable member 40; and/or maintaining the tension on the tension cable member 40. For example, first and second end fittings 42, 44 may be replaced with any combination of fasteners.

In some embodiments the skid landing gear assembly 20 including the tension cable member 40 can advantageously resist outward deflection of at least a portion of the skid landing gear assembly 20 when a downward load is applied to the skid landing gear assembly. Since the tension cable member 40 can resist outward deflection of at least a portion of the skid landing gear assembly 20 the tensile stresses thereon are reduced without appreciably changing the apparent stiffness of the skid landing gear assembly 20, which could adversely affect ground resonance stability while improving the life of the skid landing gear assembly 20.

Figure 13:
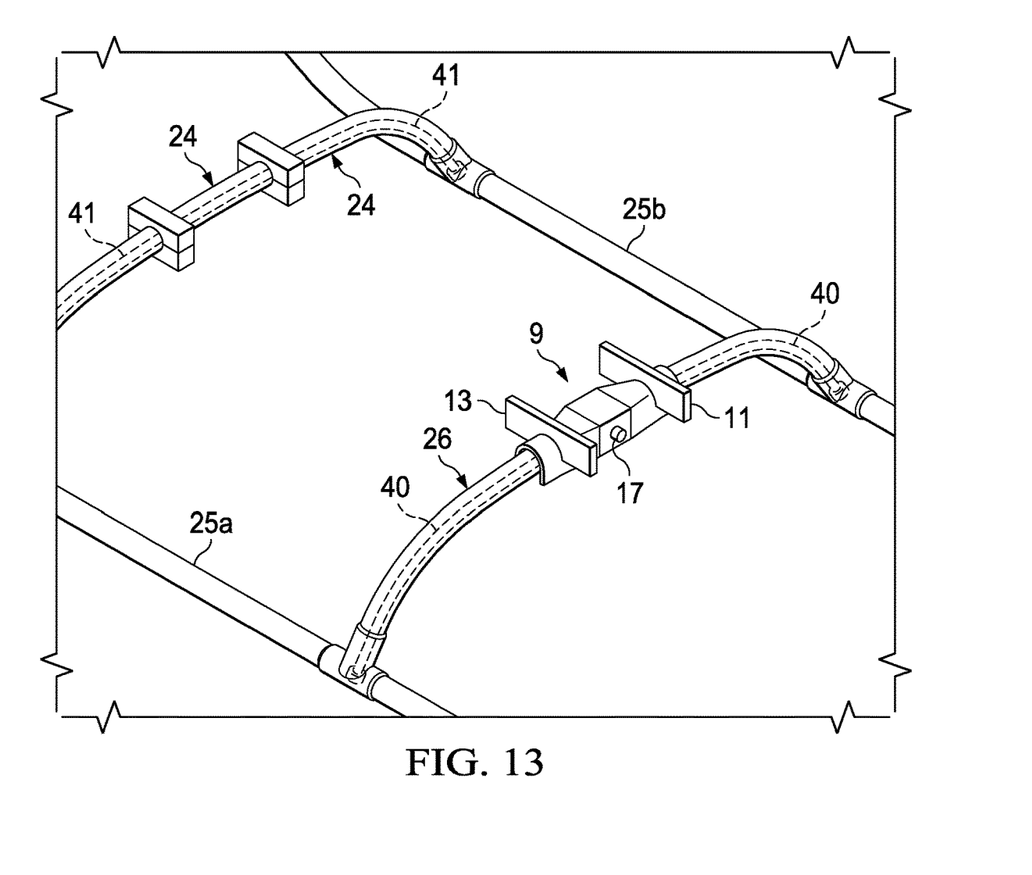
FIG. 13 is a schematic orthograph view of a skid landing gear assembly according to an exemplary embodiment.

Although embodiments of the invention are described above with respect to incorporating a tension cable member 40 in the rear cross member 26 to mitigate the problem of fatigue failures, a second tension cable member 41, as shown in FIG. 13, and its associated components can be incorporated into the front cross member 24 as may be needed in particular operational situations. In some embodiments, the skid landing gear assembly 20 includes the second tension cable member 41 in the front cross member 24 and optionally includes the tension cable member 40 in the rear cross member 26.

An embodiment includes a method of improving the fatigue life in a skid landing gear assembly 20, having a cross member (e.g., front cross member 24, rear cross member 26) connected between a first skid tube 25a and a second skid tube 25b, the method includes the step of determining an amount of tension for a tension cable member 40 disposed in the cross member for which tensile bending stresses are reduced.

In an exemplary embodiment, the step of determining an amount of tension includes determining an amount of tension for a first tension cable member 40 disposed in the rear cross member 26. The amount of tension in the rear cross member 26 can be determined to reduce bending tensile stresses during landing.

In another exemplary embodiment, the step of determining an amount of tension includes determining an amount of tension for a second tension cable member 41 disposed in the front cross member 24. The amount of tension in the front cross member 24 can be determined to reduce bending tensile stresses during landing.

In an embodiment, there is a method of designing a skid landing gear assembly having a cross member connected between a first skid tube and a second skid tube, the method comprising the step of determining an amount of tension for a tension cable member disposed in the cross member to achieve a selected stiffness therefor. The selected stiffness of the cross member retains ground resonance avoidance (e.g., the amount of the selected stiffness is limited such that it does not increase ground resonance of the cross member and/or the skid landing gear assembly).

Figure 3B:
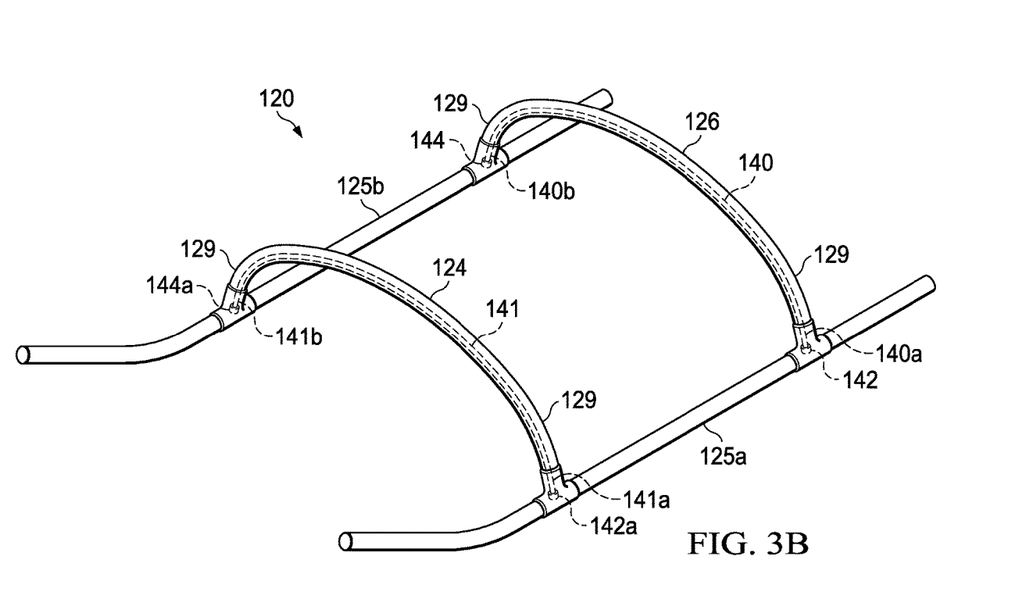
FIG. 3B is a schematic orthographic view of a skid landing gear assembly having still another configuration according to another embodiment showing a tension cable member (in dashed lines) residing in the rear cross member and an optional tension cable member (in dashed lines) received in the front cross member, according to an exemplary embodiment.
Figure 3C:
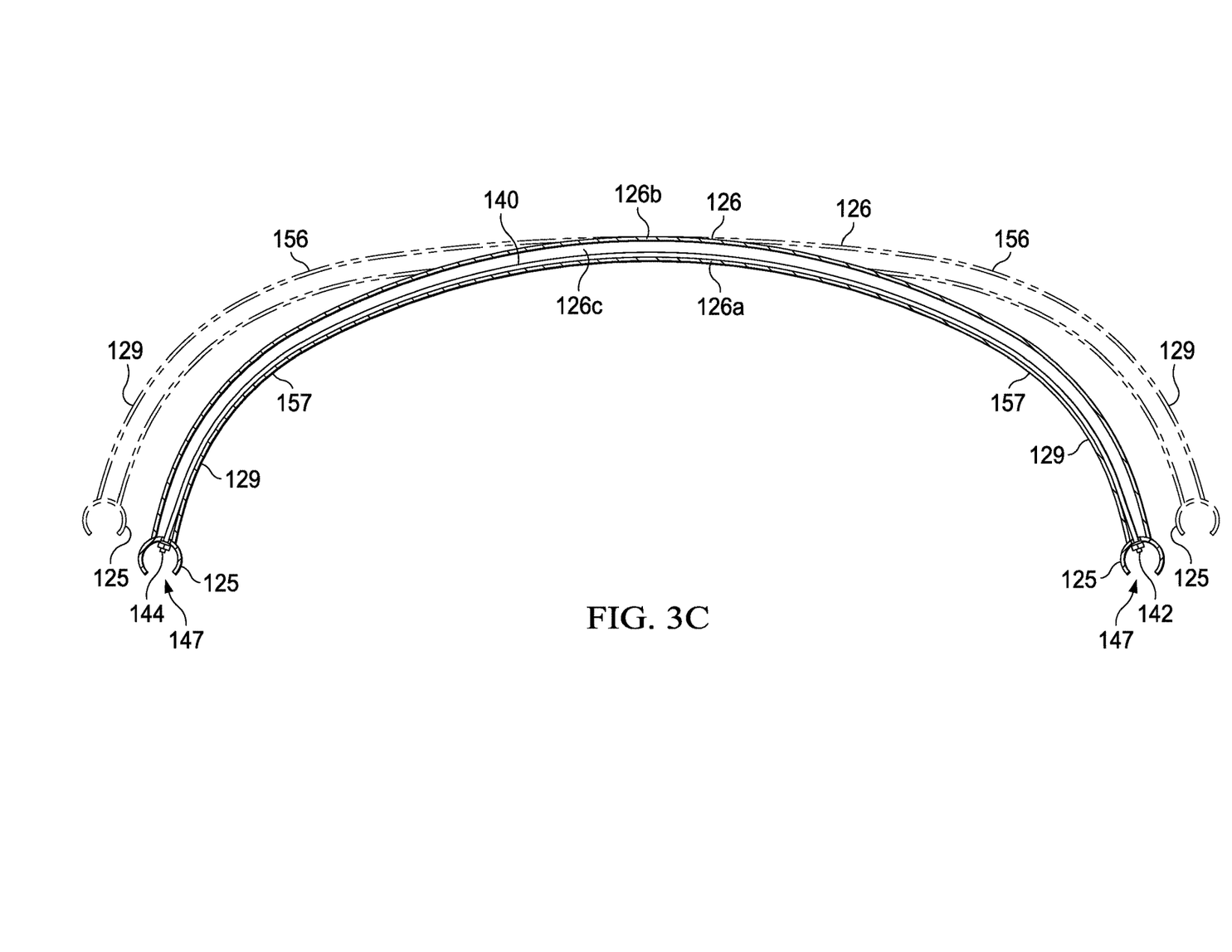
FIG. 3C is a schematic cross-sectional view of a skid landing gear assembly in a tensioned position showing a tension cable member residing in the hollow channel of the cross member during assembly (solid lines) pursuant to an illustrative embodiment, wherein the dashed or phantom lines show the original outward position of the rear cross member and skid tubes prior to being adjusted to an initial tension (e.g., a non-tensioned position)

In an embodiment, the method of designing a skid landing gear assembly can include tensioning the tension cable member the determined amount of tension to deflect at least a portion of the skid landing gear assembly (e.g., as shown in FIG. 3C)

In an exemplary embodiment of determining an amount of tension for a cross member the rear cross member 26 with a first tension cable member (e.g., tension cable member 40) is attached to the fuselage 12 with a roll-pivot assembly 9, as shown in FIG. 13. The roll-pivot assembly 9 is connected at either end to structural beams 11 and 13, which can form part of the fuselage 12. The rear cross member 26 is connected to the roll-pivot assembly 9 using the pivot pin 17. During landing, the rear cross member 26 connected to the fuselage 12 via the roll-pivot assembly 9 is decoupled from contributing to the roll natural frequency, primarily contributing forward/aft stiffness for the forward aft/bending mode (so-called low-focus pitch). Therefore, the rear cross member 26 contributes to controlling the frequency placement of this low-focus pitch mode for ground resonance avoidance. Accordingly, the determined amount of tension in the tension cable member 40 can be more than in other skid landing gear assembly configurations (e.g., a skid landing gear assembly without a roll-pivot assembly 9) since its vertical stiffness is not bounded by ground resonance avoidance. On the other hand, the front cross member 24 primarily controls ground resonance stability during landing operations for both the low-focus pitch mode and the roll mode. The vertical stiffness of the front cross member 24 is designed with this in mind. However, conventional front cross tubes, like rear cross tubes, can suffer fatigue failure and cracking of lower wall regions as result of excessive tensile bending stresses exerted on the front cross tube as a result of landing gear outward deflection experienced during repeated landings of the helicopter. Therefore, the step of determining the amount of tension in a second tension cable member 41 in the front cross member 24 can achieve a selected stiffness therefor. The selected stiffness can include a stiffness limit of the skid landing gear assembly and/or individual components therefor.

Figure 10:
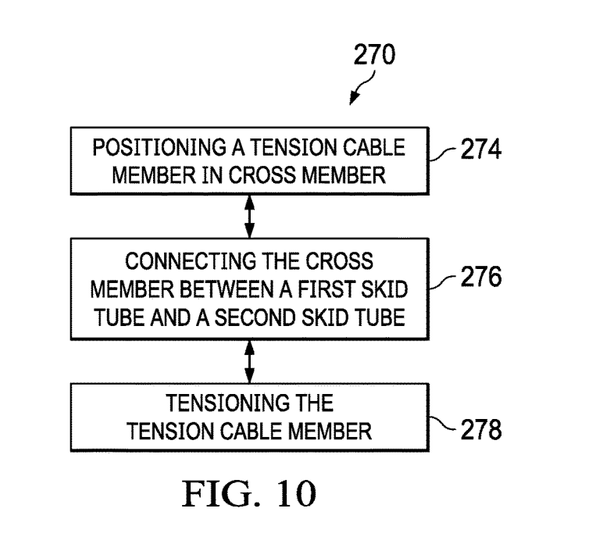
FIG. 10 is a flow chart illustrating a method of assembling a skid landing gear assembly according to an illustrative embodiment.

Referring to FIG. 10, an embodiment includes a method 270 of assembling a skid landing gear assembly 20 having at least one cross member (e.g., front and/or rear cross member 24, 26) connected between a first skid tube 25a and a second skid tube 25b including a step 274 of positioning the tension cable member 40 in at least one of the front cross member 24 and the rear cross member 26, a step 276 of connecting at least one of the front and rear cross members 24, 26 to the first and second skid tubes 25a, 25b; and a step 278 of tensioning the tension cable member 40. The cross member (e.g., front and/or rear cross member 24, 26) can be bent to a predetermined shape (e.g., a non-tension position 156), which is close to the final desired shape.

In an embodiment the step 274 of positioning the tension cable member 40 can include threading the tension cable member 40 through the hollow channel 24c, 26c from one end of the cross member (e.g., front and/or rear cross members 24, 26) to the opposite end. For example, but not a limitation, the tension cable member 40 is inserted and anchored on one side (e.g., either first or second end 40a, 40b) and the opposite end will be torqued slightly.

In an embodiment the step 276 of connecting at least one of the front and rear members 24, 26 to the first and second skid tubes 25a, 25b can occur prior to step 274. In another embodiment, step 276 occurs after step 274.

The step 278 of tensioning the tension cable member 40 can be configured to pull at least one of the first end and second end 40a, 40b of the tension cable member 40 away from the opposite end to inwardly deflect the side portions 29 of the respective cross member (e.g., front and/or rear cross member 24, 26) inward and/or toward each other. In an embodiment, the step 278 of tensioning includes torquing at least one tension adjustment member 46. For example, but not a limitation, the tension cable member 40 is inserted and anchored on one side (e.g., either first or second end 40a, 40b) and the opposite end is slightly torqued. In an embodiment, the step 278 of tensioning can include deflecting inward at least a portion (e.g., side portions 29) of the cross member by an external apparatus such as, but not limited to, a hydraulic actuator or a cable and winch with a ratchet (e.g., a come-along). Once the cross member is deflected inward by the external apparatus to a predetermined position, the tension adjustment member 46 can be tightened to a set amount (e.g., nut 52 will can be secured on the threaded adjustment shaft 48. The predetermined position can comprise the side portions 29 deflected inwardly more than the tensioned position 157. The external apparatus can be removed, resulting in increased tension in the tension cable member 40 and the cross member to be in the tensioned position 157 (e.g., the side portions 29 are deflected inward more than the non-tensioned position and less than the predetermined position). The cross member in the tensioned position 157 can then be connected to the fuselage 12.

In an exemplary embodiment of torquing at least one adjustment tension member, the tension cable member 40 is inserted into at least one cross tube (e.g., front and/or rear cross members 24, 26) and the cross pin 50 is inserted into the opening 40d in each loop 40c of the first and second ends 40a, 40b. On at least one of the first and second ends 40a, 40b, the threaded adjustment shaft 48 is threaded and passes through the skid tube opening 23a to connect with nut 52. The threaded adjustment shaft can be rotated to impart a desired amount of tension on the tension cable member 40. If the optional connecting boots 30, 32 are present, the tension cable member 40 is extended through these boots to connect to the first and second skid tubes 25a, 25b.

In some embodiments, the opposite end (e.g., first and second ends 40a, 40b) can be fastened to the respective skid tube (e.g., skid tube 25a, 25b) without the tension adjustment member 46 using various fastening members, for example, but not for limitation, a retaining ring, snap ring, pinning, welding, or other conventional fastening member.

The step 278 of tensioning the cable member can be illustrated using an embodiment of a skid landing gear assembly 120 shown in FIGS. 3B-3C. Certain components of the skid landing gear assembly 120 are as described above in connection with the skid landing gear assembly 20, except as noted herein. Those components bear similar reference characters to the components of the skid landing gear assembly 20, but with a leading '1'. The skid landing gear assembly includes front and rear cross members 124, 126 having a generally curved shape. A first tension cable member 140 is disposed in the rear cross member 126 and a second tension cable member 141 is disposed in the front cross member 124. The second tension cable member 141 is substantially symmetric to the first tension cable member 140; therefore, for the sake of efficiency only the first tension cable member 140 will be described herein. However, one of ordinary skill in the art would fully appreciate an understanding of the second tension cable member 141 based upon the disclosure herein of the first tension cable member 140.

Referring now to FIG. 3C, the rear cross member 126 is shown in dashed lines in a non-tensioned position 156 not including the first tension cable member 140. The step 278 of tensioning can include tensioning the first tension cable member 140 to inwardly deflect at least a portion of the skid landing gear assembly 120. As shown in solid lines in FIG. 3C, the side portions 129 of the rear cross member 126 are inwardly deflected and in a tensioned position 157, which occurs as a result of the threaded adjustment nut 142 on the threaded adjustment shaft 148 being torqued to a desired position to provide a desired amount of tension the first tension cable member 140. In an embodiment, the tensioned position 157 of the rear cross member 126 can include each of the side portions 129 being deflected inwardly from about 1 inch to about 5 inches from the non-tensioned position 156; however, it should be appreciated that tensioned position of the rear cross member 126 can take on a wide variety of configurations.

The step 278 of tensioning the tension cable member 140 can occur prior to attaching the skid landing gear assembly 120 to the fuselage 12 and/or while the skid landing gear assembly 120 is connected to the fuselage 112. In some embodiments, the step 278 of tensioning occurs prior to operation of the helicopter 10 such that the skid landing gear assembly 120 is "pre-tensioned" before a flight. In an embodiment, the step 278 can occur as a part of maintenance of the skid landing gear assembly 20.

In some embodiments, if tension is released on the tension cable member 140, the side portions 129 of the rear cross member 126 are no longer deflected inwardly and return to the non-tensioned position 156 (e.g. the side portions return back to their original non-tensioned outward positions).

Figure 11:
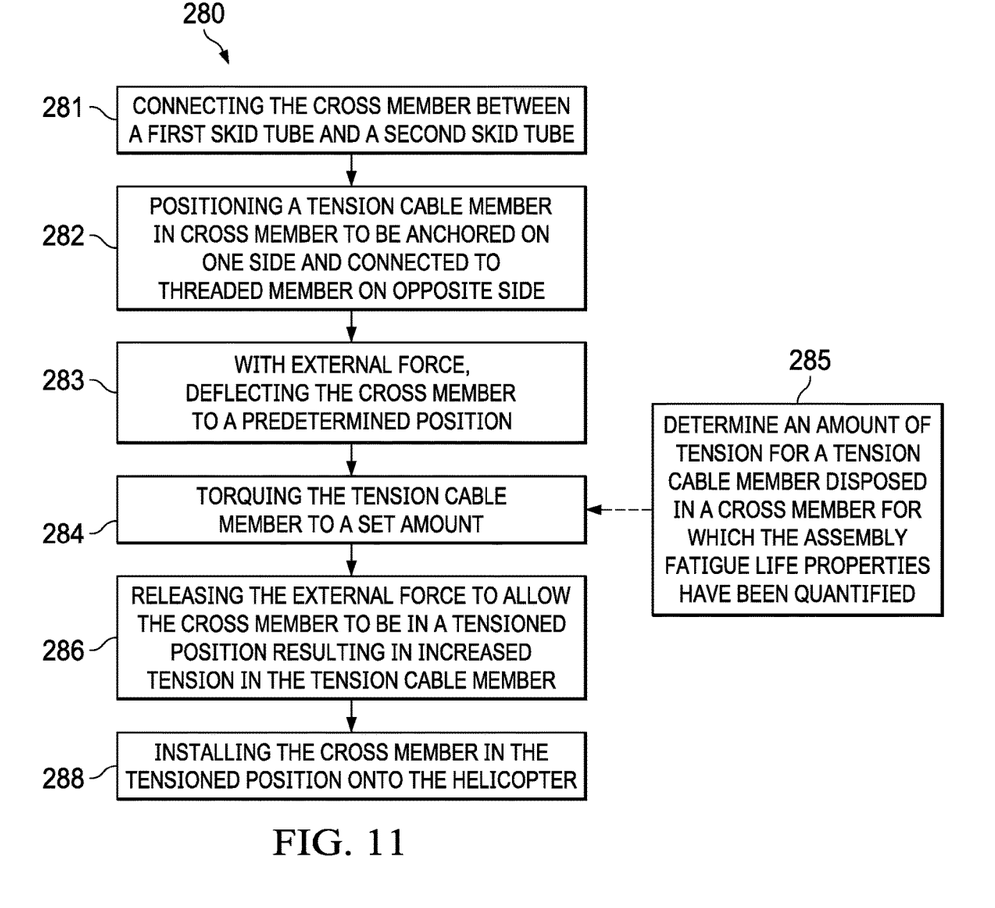
FIG. 11 is a flow chart illustrating a method of assembling a skid landing gear assembly according to an illustrative embodiment.

Referring now to FIG. 11, an exemplary embodiment of a method 280 of assembling a skid landing gear assembly 20 having at least one cross member (e.g., front and/or rear cross member 24, 26) connected between a first skid tube 25a and a second skid tube 25b is shown. The method 280 can comprise a step 281 of connecting the cross member between the first skid tube and the second skid tube, a step 282 of positioning a tension cable member in the cross tube so as to be anchored on one side and connected to a threaded member on the opposite side, a step 283 of deflecting the cross member to a predetermined position using external force by an external apparatus, a step 284 of torquing the tension cable member to a set amount such that the cross member is in a predetermined position, a step 286 of releasing the external force to allow the cross member to be in a tensioned position which results in increased tension in the tension cable member (e.g., the tension is increased in the tensioned position as compared to the tension in the predetermined position); and a step 288 of installing the cross member in a tensioned position onto the helicopter. The tensioned position of the cross member in step 286 is in a "correct" shape for assembly and installation onto the helicopter in step 288.

The method 280 can include the step 285 of determining an amount of tension for a tension cable member disposed in the cross member for which the assembly fatigue life properties have been quantified, analyzed, and/or improved as compared to an assembly without a tension cable member.

Figure 12:
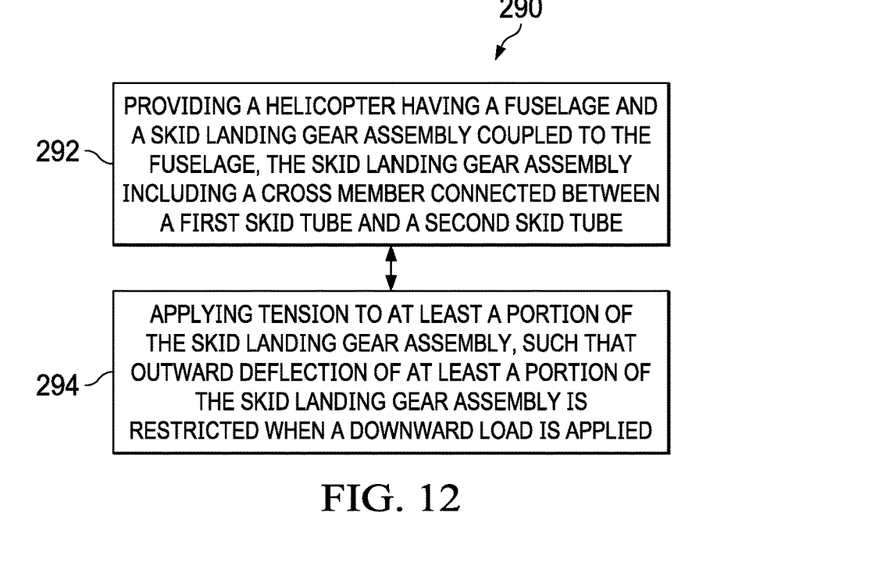
FIG. 12 is a flow chart illustrating a method of improving the service life of a skid landing gear assembly according to an illustrative embodiment.

In an embodiment shown in FIG. 12, there is a method 290 of improving the service life of a skid landing gear assembly (e.g. skid landing gear assembly 20, skid landing gear assembly 120), the method including the step 292 of providing a helicopter having a fuselage and a skid landing gear assembly coupled to the fuselage, the skid landing gear assembly including a cross member connected between a first skid tube and a second skid tube; and the step 294 of applying tension to at least a portion of the skid landing gear assembly, such that outward deflection of at least a portion of the skid landing gear assembly is resisted when a downward load is applied. Resisting the outward deflection of at least a portion of the skid landing gear assembly can reduce the bending stress thereof during landing, thus increasing fatigue life. In other words, because at least a portion of the skid landing gear assembly is tensioned to resist deflection, fatigue life is improved as compared to convention non-tensioned skid landing gear assemblies.

FIGS. 6-9 is still another example of a skid landing gear assembly 320. Certain components of the skid landing gear assembly 320 are as described above in connection with the skid landing gear assemblies 20, 120, except as noted herein. Those components bear similar reference characters to the components of the skid landing gear assemblies 20, 120, but with a leading '3'. The skid landing gear assembly 320 includes an integral front cross member 324 (e.g., the front cross member 324 is integral with the first and second skid tubes 325a, 325b). The skid landing gear assembly 320 includes a second tension cable member 341 having an extended length and configured to extend from a first closed end 325e of the first skid tube 325a through the front cross member 324 to the second closed end 325f of the second skid tube 325b. The second tension cable member 341 can be disposed in the channel 325c in the first and second skid tubes 325a, 325b. In an exemplary embodiment, the first and second closed ends 325e, 325f are in the aft portion of the skid landing gear assembly 320. Each of the first and second closed ends 325e, 325f can include a first and second end fitting 342a, 344a, respectively, for adjusting the tension of the second tension cable member 341 and securing the second tension cable member 341 to the first and second skid tubes 325a, 325b. Each of the first and second closed ends 325e, 325f can include a welded circular plate with an opening 323a, 323b therein to receive the first and second fittings 342a, 344a therein as described herein with reference to FIG. 4. The second tension cable member 341 is tensioned and can cause inward deflection of at least a portion of the skid landing gear 320 (e.g., the front cross member 324).

Figures 6, 7, 8, 9:
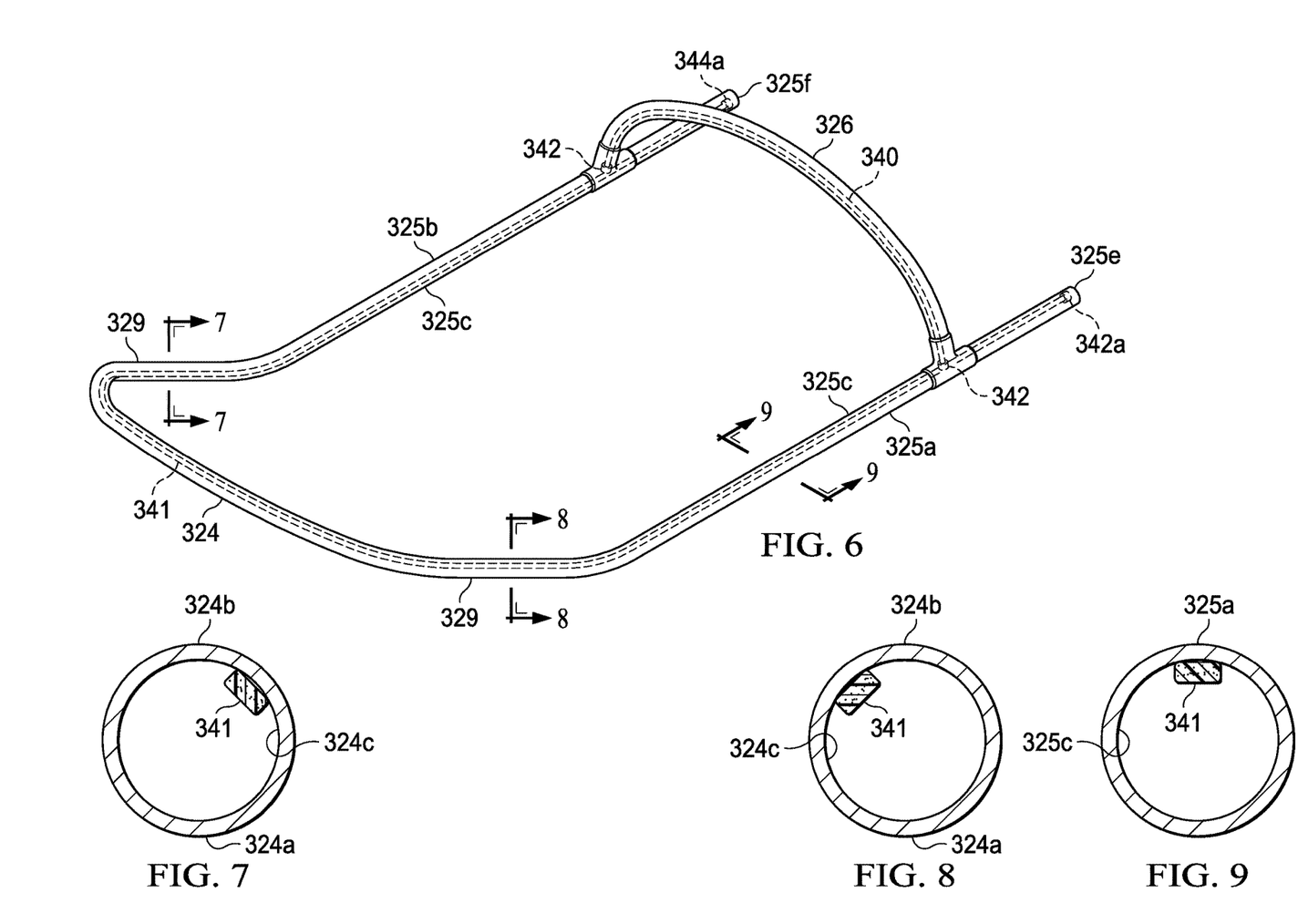
FIG. 6 is a schematic orthographic view of a skid landing gear assembly having another configuration according to another embodiment showing an optional tension cable member (in dashed lines) residing in the hollow channel of the front cross member and extending through the first and second skid tubes to their respective closed ends and showing a separate tension cable member (in dashed lines) residing in the hollow channel of the rear cross member during assembly.
FIG. 7 is a cross-sectional view (taken along lines 7-7 of FIG. 6) of the front cross member showing a position of the tension cable member therein according to an illustrative embodiment.
FIG. 8 is a cross-sectional view (taken along lines 8-8 of FIG. 6) of the front cross member showing a position of the tension cable member therein according to an illustrative embodiment.
FIG. 9 is a cross-sectional view (taken along lines 9-9 of FIG. 6) of the skid tube showing a position of the tension cable member therein according to an illustrative embodiment.

The positions of the second tension cable member 341 in the side portions 329 of the front cross member 324 are shown in FIGS. 7 and 8. The position of the second tension cable member 341 in the first skid tube 325a is shown in FIG. 9. The adjustment nut(s) of the end fittings 342a, 344a are accessible for torquing by a torquing tool (e.g. a pneumatic or other socket wrench) as a result of residing outboard of the closed ends 325e, 325f of the first and second skid tubes 325a, 325b. A cap (not shown) can be positioned over each of the closed ends 325e, 352f during operation of the helicopter 10.

In one embodiment, the side portions 329 of the rear cross member 326 are deflected inwardly by the first tension cable member 340 (see FIG. 3C). In some embodiments, at least a portion of the first and second skid tubes 325a, 325b is deflected inwardly toward one another by the tension in the first tension cable member 340. At least one of the first and second end fittings 342, 344 are adjusted to achieve the desired amount of tension for the first tension cable member 340. The first tension cable member 340 is adjusted to such an amount of tension that tensile stress exerted on at least the rear cross member 326, especially the lower concave wall 326a of the rear cross member 326, is reduced when a vertical load is applied (e.g., during landing of the helicopter 10) to the skid landing gear assembly 320. That is, the first tension cable member 340 carries at least a designed portion of the tensile load in response to vertical loads of the skid landing gear assembly 320 during helicopter landing to thereby reduce the tension load exerted on the rear cross member 326. A first tension cable member 340 and its associated end fittings 342, 344 can be received and tensioned in the rear cross member 326 in a manner described above for FIG. 4 and as may be needed in particular operational situations.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

It may be advantageous to set forth definitions of certain words and phrases used in this patent document. The term "connect" and its derivatives refer to any direct or indirect communication between two or more elements, whether or not those elements are in physical contact with one another. The term "resist" and its derivatives refer to opposing and/or combating at least a portion of the forces of deflection thereon. The terms "include" and "comprise," as well as derivatives thereof, mean inclusion without limitation. The term "or" is inclusive, meaning and/or. The term "and/or" can mean at least one. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Terms such as "first" and "second" are used only to differentiate features and not to limit the different features to a particular order or to a particular quantity. The term "outward" and its derivatives refer to being towards the outside of helicopter. The term "inward" and its derivatives refer to being towards a centerline of the helicopter. The terms "generally" or "substantially" are defined as largely, but not necessarily wholly, what is specified (and includes what is specified; e.g., substantially 90 degrees includes 90 degrees), as understood by a person of ordinary skill in the art. Use of the term "optional" and its derivatives means that the element is required, or alternatively, the element is not required, both alternatives being within the scope of the claim.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A skid landing gear assembly, comprising:
    a cross member disposed between a first skid tube and a second skid tube, and
    a tension cable member configured to be disposed in the cross member;
    wherein the tension cable member resists outward deflection of at least a portion of the skid landing gear assembly when a downward load is applied to the skid landing gear assembly;
    wherein the tension cable member includes a first end and a second end connected to the respective first and second skid tubes; and
    wherein the tension cable member includes a first end fitting and a second end fitting connecting the tension cable member to the respective first and second skid tubes wherein at least one of the first and second end fittings includes a tension adjustment member to adjust the tension in the tension cable member.

2. The assembly of claim 1, wherein the cross member comprises a cross tube.

3. The assembly of claim 1, wherein the tension adjustment member comprises:
    a threaded shaft connected to at least one of the first end of the tension cable member and the second end of the tension cable member; and
    an adjustment nut threaded on the shaft.

4. The assembly of claim 1, wherein the tension cable member is a single or multi-strand cable comprised of at least one of the following: a metallic material, a non-metallic material, and combinations thereof.

5. The assembly of claim 1, wherein the tension cable member comprises a composite cable.

6. The assembly of claim 5, wherein the composite cable comprises fibers disposed in a matrix.

7. The assembly of claim 1, wherein the cross member comprises at least one of the following: a front cross member and a rear cross member.

8. The assembly of claim 1, wherein the respective first and second ends of the tension cable member are connected to an intermediate portion of the respective first and second skid tubes.

9. The assembly of claim 1, wherein the tension cable member is received in the cross member and also in at least a portion of the respective first and second skid tubes.

10. The assembly of claim 9, wherein the respective first and second ends of the tension cable member are connected to a closed end of the respective first and second skid tubes.

* * * * *